(12) United States Patent
Nuyens et al.

(10) Patent No.: US 7,629,390 B2
(45) Date of Patent: Dec. 8, 2009

(54) METHOD FOR PREPARING EMULSIONS

(75) Inventors: Jan Nuyens, Vosselaar (BE); Johan Martens, Huldenberg (BE)

(73) Assignee: K.U. Leuven Research & Development, Leuven (BE)

( * ) Notice: Subject to any disclaimer, the term of this patent is extended or adjusted under 35 U.S.C. 154(b) by 565 days.

(21) Appl. No.: 10/534,677

(22) PCT Filed: Nov. 14, 2003

(86) PCT No.: PCT/BE03/00198

§ 371 (c)(1),
(2), (4) Date: Jul. 25, 2005

(87) PCT Pub. No.: WO2004/043580

PCT Pub. Date: May 27, 2004

(65) Prior Publication Data
US 2006/0040043 A1 Feb. 23, 2006

(30) Foreign Application Priority Data
Nov. 14, 2002 (GB) ................. 0226503.1
Feb. 26, 2003 (GB) ................. 0304356.9

(51) Int. Cl.
*C12H 1/06* (2006.01)
*A23L 1/24* (2006.01)
(52) U.S. Cl. ................ 516/53; 426/665; 516/70; 516/71
(58) Field of Classification Search ............. 516/53
See application file for complete search history.

(56) References Cited
U.S. PATENT DOCUMENTS

| 4,522,803 | A | 6/1985 | Lenk et al. | |
| 4,558,579 | A | 12/1985 | Petkov et al. | |
| 4,597,671 | A | 7/1986 | Marelli | |
| 5,985,979 | A * | 11/1999 | Southwick et al. | 524/505 |
| 2002/0014033 | A1 | 2/2002 | Langer et al. | |
| 2004/0057988 | A1* | 3/2004 | Tsuchida et al. | 424/450 |

FOREIGN PATENT DOCUMENTS

| EP | 0 185 756 | | 8/1990 |
| GB | 1171068 | * | 11/1969 |
| GB | 1055436 | | 1/1997 |
| JP | 52-050982 | | 4/1977 |
| JP | 09-201159 | | 8/1997 |
| JP | 10-095189 | | 4/1998 |
| JP | 11-513036 | | 11/1999 |
| JP | 2000-024119 | | 1/2000 |
| JP | 2000263062 | | 9/2000 |
| JP | 2001-300277 | | 10/2001 |
| JP | 2001348581 | | 12/2001 |
| JP | 2003-110388 | | 4/2003 |
| RU | 2099974 C1 | * | 12/1997 |
| WO | WO 97-49375 | | 12/1997 |
| WO | WO 99/07231 | * | 2/1999 |
| WO | WO 01/18095 | | 3/2001 |

OTHER PUBLICATIONS

International Search Report (PCT/BE2003/00198) mailed Mar. 19, 2004.
International Preliminary Examination Report (PCT/BE2003/00198) mailed Feb. 4, 2005.
Office Action for Japanese Patent Application 206628/2005, mailed Aug. 4, 2009 (and its English translation).

* cited by examiner

*Primary Examiner*—Ling-Siu Choi
*Assistant Examiner*—Chun-Cheng Wang
(74) *Attorney, Agent, or Firm*—Clark & Elbing LLP

(57) ABSTRACT

The invention relates to a method and a system for the emulsification of a pre-mix of two or more immiscible liquids by flowing or circulating one or more times said pre-mix through one or more magnetic fields.

17 Claims, 4 Drawing Sheets

METHOD FOR PREPARING EMULSIONS

CROSS REFERENCE TO RELATED APPLICATIONS

This application is the U.S. National Stage of International Application No. PCT/BE2003/000198, filed Nov. 14, 2003, which, in turn, claims the benefit of GB 0226503.1 filed Nov. 14, 2002 and GB 0304356.9 filed Feb. 26, 2003.

The present invention is in the field of the manufacture of emulsions. Particularly, the invention is in the field of preparing stable oil-in-water and water-in-oil emulsions. More specifically, the invention relates to a method and a system for the preparation of stable emulsions by conducting an unstable pre-mixture of immiscible fluids, optionally containing solid particles, through one or more magnetic fields.

BACKGROUND OF THE INVENTION

Emulsions may be broadly defined as metastable colloidal dispersions of liquid droplets in another liquid phase. Typically, emulsions are disperse systems comprising at least two liquids which are virtually insoluble in one another. Besides the said at least two liquid phase components and optionally solid particles and/or one or more emulsifiers, the formation of an emulsion requires energy and occurs at conditions far from equilibrium. In general, the formation of an emulsion comprises the two following steps:

in an initial step, at least two components are pre-mixed, the said at least two components being originally liquid phase immiscible, the pre-mixing preferably being in the presence of a suitable amount of one or more emulsifiers, in order to create droplets of a dispersed liquid phase in another continuous liquid phase;

thereafter, the droplets resulting from the initial step are disrupted by shear forces or by local pressure differences, i.e. by inertial forces, thus resulting in a more stable emulsion of usually smaller droplets.

At present, different types of mechanical emulsification processes are used in the production of finely dispersed emulsions, each process requiring specific equipment. Within these emulsification systems, four major categories may be recognized:

droplet disruption in a high shear rotor-stator system,
droplet disruption by ultrasound,
droplet disruption in high-pressure systems, and
droplet formation at micropores (using microporous membranes or microchannels).

Also non-mechanical processes may be applied, such as precipitation of the dispersed phase previously dissolved in the continuous phase, phase inversion method and phase inversion temperature method.

Emulsions may either be produced directly as consumer products or as intermediates for use within a broad range of industrial applications including, in a far from exclusive list, food, paints, cosmetics, pharmaceuticals, explosives, rocket fuel, lubricants, foam-controlling agents, etc. Most industrial applications or consumer products require that emulsions have maximal storage stability. The storage stability refers to the period of time during which the emulsion can be kept before it separates again into different phases. Mechanisms that can be identified in the process of breaking down an emulsion include the so-called Ostwald ripening, creaming, aggregation, coalescence, and partial coalescence. The process of breaking down an emulsion can be influenced or monitored, and therefore storage stability can be controlled or increased, in the two following ways: using mechanical devices to control the size of the dispersed droplets and/or adding stabilising chemical additives or emulsifiers in order to keep the emulsion dispersed.

Emulsions have great importance in the plastics (i.e. polymers) industry, especially in the detergents and cleaning products industries, in the production of lubricants, cosmetic, veterinary or pharmaceutical compositions (e.g. creams and ointments) and, in particular, in food products technology as well. Since many emulsions comprise at least one hydrophilic liquid and at least one lipophilic liquid, a further distinction is usually made, depending on the nature of the internal, disperse phase, between oil-in-water emulsions and water-in-oil emulsions. The internal or the external phase of the emulsion may itself in turn be a disperse system and may, for example, include particles of solids dispersed in the respective liquid phase, a system of this kind being also referred to as a multiphase emulsion. Owing to the interfacial tension which exists between the droplets of the internal phase and the droplets of the continuous, external phase, emulsions are in general thermodynamically unstable and thus after some time a phase separation occurs which may be induced, for example, by droplet sedimentation or coagulation. In order to prevent such phase separation it is common, during emulsion manufacturing, to add emulsifying auxiliaries, such as emulsifiers (which lower the interfacial tension) or stabilisers (which, for instance, prevent or at least greatly retard the sedimentation of the droplets, by increasing the viscosity of the continuous, external phase).

When the at least two liquid phase components of an emulsion are mixed together, the initial result is a coarsely disperse crude emulsion. By supplying mechanical energy, the large drops of the crude emulsion are broken up and the desired fine emulsion is formed. The smallest droplet size achievable in the last step of the emulsification process depends not only on the respective input of power in the emulsifying equipment but can be also critically influenced by the nature and concentration of the emulsifying auxiliaries. For example, in order to produce ultra-thin emulsions, it is essential that the new interfaces which are formed mechanically be occupied very rapidly by the emulsifier in order to prevent coalescence of the droplets.

The average size of the droplets of the disperse phase can be determined in accordance with the principle of quasi-elastic dynamic light scattering, for instance by using a Coulter N4+ particle analyser commercially available from Coulter Scientific Instruments.

A wide variety of liquid dispersing machines are used for producing emulsions. Emulsions of medium to high viscosity are produced mainly by means of rotor-stator systems, such as colloid mills or gear-rim dispersing machines. Low-viscosity emulsions have to date been produced mainly using high-pressure homogenizers, in which case the crude emulsion under a pressure of between about 100 bars and 1,000 bars is discharged through the about 10 to 200 μm high radial gap of a homogenizing nozzle. It is assumed that drop break-up in this case is mainly attributable to the effect of cavitation. One specific design of a high-pressure homogenizer is the microfluidizer, which operates at relatively low pressures of about 100 bars. However, high-pressure homogenizers are not without disadvantages. Especially when emulsifying polymerizable systems or when producing multiphase emulsions including solid particles, the narrow radial gap of the homogenizing nozzle may easily become clogged. The subsequently required cleaning is time-consuming and complex. Moreover, the high pressures used in this type of equipment entail sealing problems, especially when using liquid components which attack the equipment sealants. A further disadvantage of high-pressure homogenizers is that drop size and throughput are closely linked with each other. Such equipment is therefore unsuitable for producing emulsions in whose disperse phase it is intended to disperse solid particles.

Liposomes may be defined as vesicles in which an aqueous volume is entirely enclosed by a bilayer membrane composed of lipid molecules. When dispersing these lipids in aqueous media, a population of liposomes with sizes ranging from about 15 nm to about 1 μm may be formed. The three major types of lipids, i.e. phospholipids, cholesterol and glycolipids, are amphipathic molecules which, when surrounded on all sides by an aqueous environment, tend to arrange in such a way that the hydrophobic "tail" regions orient toward the center of the vesicle while the hydrophilic "head" regions are exposed to the aqueous phase. According to this mechanism liposomes thus usually form bilayers.

Several types of liposomes are known in the art. Referring to their physical structure, the more easily accessible type of liposomes consists of multilamellar vesicles (hereinafter referred to as MLV, according to standard practice in the art), i.e. onion-like structures characterized by multiple membrane bilayers, each separated from the next by an aqueous layer, usually having a size between about 100 nm and 1 μm, which known e.g. from U.S. Pat. No. 4,522,803 and U.S. Pat. No. 4,558,579. Their production can be reproducibly scaled-up to large volumes and they are mechanically stable upon storage for long periods of time.

By contrast, small unilamellar vesicles (hereinafter referred to as SUV, according to standard practice in the art) usually having a size between about 15 nm and 200 nm, possess a single bilayer membrane and are usually difficult to prepare on a large scale because of the high energy input required for their production and of the risks of oxidation and hydrolysis. In addition, SUV are thermodynamically unstable and are susceptible to aggregation and fusion. Furthermore, as the curvature of the membrane increases in SUV, it develops a degree of asymmetry, i.e. the restriction in packing geometry dictates that significantly more than 50% and up to 70% of the lipids making up the bilayer are located on the outside. Because of this asymmetry, the behaviour of SUV is markedly different from that of bilayer membranes comprising MLV or from that of large unilamellar vesicles (the latter, hereinafter referred to as LUV, usually having a size between about 100 nm and 1 μm).

Referring to their chemical structure, liposomes may be made from neutral phospholipids, negatively-charged (acidic) phospholipids, sterols and other non-structural lipophilic compounds. For instance, a population of detergent-free liposomes having a substantially monomodal distribution (i.e. unilamellar vesicles) about a mean diameter greater than 50 nm and exhibiting less than a two-fold variation in size may be produced (e.g. according to EP-B-185,756) by first preparing multilamellar liposomes and then repeatedly passing them under pressure through a filter having a pore size not more than 100 nm. For a detailed description of liposomes and methods of manufacturing them, reference is hereby made to Liposomes, a practical approach (1990), Oxford University Press. Liposome manufacturing and quality control encounters many of the difficulties set forth hereinabove in respect of other dispersed systems including multiphase emulsions.

Thus there is a need in the art for providing an economical and improved alternative to the existing mechanical and non-mechanical processes for making emulsions. In particular, there is a need in the art for providing an emulsification process which avoids the requirement of complex mechanical equipment and the associated maintenance costs, while resulting in a desirable droplet size within a limited period of time and simplifying its quality control procedure, and while achieving a prolonged storage stability of the resulting emulsion. There is also a need in the art for modulating the characteristics, such as micelle size, of an emulsion either during or after its manufacturing. All the above needs apply to liposome manufacturing as well, more specifically including improving trapping efficiency and stability of multilamellar liposomes.

SUMMARY OF THE INVENTION

The deficiencies of the prior art as discussed above are overcome or alleviated by the method of the present invention, wherein storage-stable emulsions may be produced by cost-efficient means by conducting or circulating a pre-mix, i.e. a usually unstable mixture, of two or more originally immiscible liquids through one or more magnetic fields under conditions suitable for emulsifying the said pre-mix. In a preferred embodiment of the invention, the said pre-mix may further comprise one or more emulsifiers or emulsion stabilizers.

In a second aspect, there is provided a system for the preparation of an emulsion according to the method of the invention. Said emulsification system comprises means for generating one or more magnetic fields, such as a magnetic fluid conditioner, the said means being mounted in a circuit or loop comprising at least a liquid containing portion, i.e. a reservoir or container, filled with two or more originally immiscible liquids, the said system further comprising means whereby the two or more liquids contained in the liquid containing portion can be conducted or circulated through the said one or more magnetic fields being for instance generated by the magnetic fluid conditioner. Optionally, a mixer may be mounted on the liquid containing portion of the emulsification system for stirring the two or more liquids contained therein. In a preferred embodiment, the circuit or loop includes one or more tubings, channels or ducts wherein the two or more liquids can flow from and back to the liquid containing portion, and the means for circulating the two or more liquids through the magnetic field(s) includes one or more pumps mounted in the said circuit or loop. The said pump(s) may be designed or operated such as to allow for controlling or regulating, e.g. keeping constant or else varying according to a predetermined scheme, the speed at which the two or more liquids are conducted or circulated through the magnetic field(s). In a more preferred embodiment, the two or more liquids may be re-circulated one or more times through the magnetic field(s) back into the liquid containing portion of the system, for instance until an emulsion with suitable characteristics (e.g. droplet or micelle average size or size distribution) is obtained. Optionally, pre-mixing of the two or more immiscible liquids may be carried out or conducted through a magnetic field before transferring the resulting pre-mix to the liquid containing portion of the above-mentioned system.

The method of the invention may be carried out continuously or intermittently, the latter meaning with storage of the emulsion in the liquid containing portion of the emulsification system of the present invention after and before conducting or circulating the said emulsion through the one or more magnetic field(s). Intermittent circulation through the magnetic field may, for certain emulsions of two or more liquids, allow improving the storage stability of the said emulsions.

DETAILED DESCRIPTION OF THE INVENTION

Figure 1A:
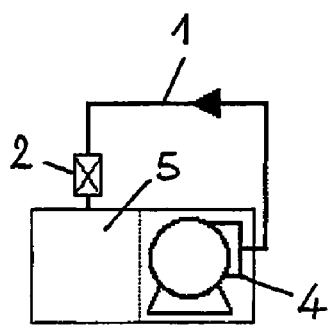
FIG. 1A represents a first embodiment of an emulsification system for performing a method according to the invention.

The present invention will be described with reference to certain embodiments and drawings but the present invention is not limited thereto but only by the attached claims. The embodiments are given by way of example only.

The present invention relates to the unexpected finding that circulating an unstable mixture of immiscible liquids through a magnetic field under suitable conditions, such as magnetic field strength, temperature, number of re-circulation times and the like, results in a stable emulsion. Furthermore, various operational parameters of this method were identified as relevant to the efficiency of preparation of a stable emulsion and to the stability of the said emulsion. The influence of some of these parameters is detailed herein-after and illustrated in the following examples.

A first embodiment of this invention relates to a method for preparing emulsions of two or more immiscible liquids by flowing, conducting or circulating one or more times a pre-mix of said liquids, optionally having solid particles suspended therein, through one or more magnetic fields. The present invention also provides the use of equipment for performing the method, i.e. an emulsification system comprising two or more immiscible liquids, means for generating one or more magnetic fields, and means for flowing or circulating said fluid one or more times through the said one or more magnetic fields. A means for measuring the average size or size distribution of the emulsion droplets or micelles may also be provided as a further component of the emulsification system of the invention.

The number of immiscible liquids is not a critical parameter of the present invention. For some emulsions, the presence of both at least a hydrophilic liquid, for instance an aqueous or nearly-aqueous phase, and at least a lipophilic (or hydrophobic) liquid is preferred. The chemical nature, molecular size or other physical characteristic of the lipophilic (or hydrophobic) liquid is not critical. Such lipophilic liquids include, without limitation, edible oils (e.g. palm kernel oil, lauric oil, hydrogenated vegetable oils like soybean oil), fats and related products; fatty acids and esters thereof (including esters formed from a saturated or unsaturated linear or branched aliphatic alcohol having from 1 to 18 carbon atoms, in particular methyl or ethyl esters, or from a saturated or unsaturated linear or branched aliphatic polyol having from 2 to 6 carbon atoms, in particular glycerol, trimethylolpropane, sorbitan, sorbitol, pentaerythritol, neopentyl glycol and mixtures thereof, or from a polyethyleneglycol or polypropyleneglycol or methoxy polyethyleneglycol having a molecular weight up to 1,500), preferably natural or synthetic, saturated, mono-unsaturated or polyunsaturated acids having from 8 to 24 carbon atoms and optionally one or more functional groups such as hydroxy or epoxy such as caprylic, capric, lauric, myristic, palmitic, stearic, behenic, oleic, linoleic, linolenic, ricinoleic, arachidic, palmitoleic, stearidonic, arachidonic and isopalmitic acids; lipids of all kinds, including mono- and poly-acylglycerols, phosphoglycerides, sphingolipids, amino-amidines and the like, and mixtures thereof in all proportions, which are commonly used for making liposomes in the form of multilamellar or small unilamellar vesicles. As shown in examples below, the present invention is also applicable to the emulsification of saturated hydrocarbons having long carbon chain length such as, but not limited to, dodecane.

It should be understood that the effect of the method of the invention on the average size of droplets or micelles of the emulsion is more important when the strength of the magnetic field is higher and/or the number of re-circulations through the magnetic field is higher. Since the strength of each commercially available magnet is usually limited to about 10,000 gauss, a means to increase the effective magnetic field is to flow the suspension through a number of magnets arranged in series (especially for limiting or prolonging the duration of treatment) and/or to re-circulate the suspension several times, i.e. preferably at least 10 times, more preferably at least 40 times, through the same magnetic field. Preferably the strength of each said magnetic field used for carrying out the method of the invention is at least about 2,000 gauss at the active region thereof.

Whatever the nature and the number of immiscible liquids, flowing the pre-mix of said liquids through the magnetic field(s) is preferably effected at a temperature below the Curie temperature of the magnetic material used for generating said magnetic field(s), e.g. below about 400° C. for a magnetic device of the Al—Ni—Co type. Flowing the pre-mix of said liquids through said magnetic field(s) is also preferably effected at a temperature between the freezing or solidifying temperature and the boiling temperature of said pre-mix under the pressure prevailing while flowing said pre-mix of liquids through said magnetic field(s). For instance, under atmospheric pressure, flowing said pre-mix of immiscible liquids through said magnetic field(s) is preferably effected at a temperature between about 10° C. and about 90° C., for practical and economical reasons more preferably between about 18° C. and about 70° C. The respective proportions of the immiscible liquids in the pre-mix to be magnetically treated is not a critical parameter of this invention and may be adapted, using standard practice in the art, depending upon the consumer product or industrial application which is targeted for the relevant emulsion. For instance, the proportion of the lipophilic liquid(s) in the pre-mix may be within a range from about 3 to about 60% by weight, preferably from 5 to 40% by weight, more preferably from 10 to 35% by weight, depending upon the exact nature of the said lipophilic liquid(s) and the optional emulsifiers.

For certain pre-mix of immiscible liquids, it may be advantageous to carry out the method of this invention in the presence of one or more viscosity regulators and/or one or more emulsifiers or surfactants of any class well known in the art, e.g. anionic surfactants, non-ionic surfactants or cationic surfactants. The selection of suitable emulsifiers and the desirable amount thereof, depending upon the exact nature and amount of the said lipophilic liquid(s), are within the knowledge of those of ordinary skill in the art.

Suitable emulsifiers or surface-active agents include water-soluble natural soaps and water-soluble synthetic surface-active agents. Suitable soaps include alkaline or alkaline-earth metal salts, unsubstituted or substituted ammonium salts of higher fatty acids ($C_{10}$-$C_{22}$), e.g. the sodium or potassium salts of oleic or stearic acid, or of natural fatty acid mixtures obtainable form coconut oil or tallow oil. Synthetic surface-active agents (surfactants) include anionic, cationic and non-ionic surfactants, e.g. sodium or calcium salts of polyacrylic acid; sulphonated benzimidazole derivatives preferably containing 8 to 22 carbon atoms; alkylarylsulphonates; and fatty sulphonates or sulphates, usually in the form of alkaline or alkaline-earth metal salts, unsubstituted ammonium salts or ammonium salts substituted with an alkyl or acyl radical having from 8 to 22 carbon atoms, e.g. the sodium or calcium salt of lignosulphonic acid or dodecylsulphonic acid or a mixture of fatty alcohol sulphates obtained from natural fatty acids, alkaline or alkaline-earth metal salts of sulphuric or sulphonic acid esters (such as sodium lauryl sulphate) and sulphonic acids of fatty alcohol/ethylene oxide adducts. Examples of alkylarylsulphonates are the sodium, calcium or alcanolamine salts of dodecylbenzene sulphonic acid or dibutyl-naphtalenesulphonic acid or a naphtalene-sulphonic acid/formaldehyde condensation product. Also suitable are the corresponding phosphates, e.g. salts of phosphoric acid ester and an adduct of p-nonylphenol with ethylene and/or propylene oxide) and the like.

Suitable emulsifiers further include partial esters of fatty acids (e.g. lauric, palmitic, stearic or oleic) or hexitol anhydrides (e.g., hexitans and hexides) derived from sorbitol, such as commercially available polysorbates. Other emulsifiers which may be employed include, but are not limited to, materials derived from adding polyoxyethylene chains to non-esterified hydroxyl groups of the above partial esters, such as Tween 60 commercially available from ICI Americas Inc.; and the poly(oxyethylene) poly(oxypropylene) materials marketed by BASF under the trade name Pluronic.

Preferably the method according to the invention involves re-circulating two or more times the liquids through the magnetic field(s). The number of re-circulation times may be quite high, e.g. up to 10,000 times through one magnetic field, preferably up to 3,000 times through one magnetic field, and may be easily adapted to the specific average size targeted for the droplets or micelles of an emulsion designed for a certain industrial or consumer product application. It is important that the liquids are flowed or circulated through the magnetic field(s) at a speed which allows the magnetic treatment to effectively perform droplet or micelle formation to a significant extent within a specified period of time. Preferably, the linear flow rate of said liquids through each said magnetic field is between 0.25 and 25 m/s, more preferably between 0.6 and 5 m/s. In view of the length of the magnetic field, it may be calculated that the residence time of said liquids through each said magnetic field is preferably between 60 microseconds and 10 seconds, depending upon the number or re-circulation times.

The present invention also provides an industrial process which, in addition to including the above described emulsification method as a process step, may further comprise one or more post-processing steps. Said post-processing step may be a heating step or, especially for improving the stability of the resulting emulsion, a cooling step preferably to a temperature below room temperature, more preferably to a temperature within a range from about 2° C. to about 8° C. It is usually advantageous to perform said cooling step until the moment when the emulsion is to be effectively used in the relevant final application.

In another embodiment, said post-processing step may be a drying step, which can be performed by any known drying technique, for at least partly removing the hydrophilic liquid from the emulsion. For instance, when the lipophilic phase liquid(s) consist of lipids suitable for making liposomes, said post-processing step may be a freeze-drying step suitable for handling and storing the liposomes formed in the solid state. In yet another variant of the is invention, the post-processing step may be a step of diluting the emulsion through the addition of a hydrophilic liquid, preferably the same as originally used, into said emulsion. In yet another variant of the invention, the post-processing step may be a sonication step.

For quality control purpose, the industrial process of the invention may further comprise one or more steps of controlling the size of droplets or micelles produced during the emulsification method. In view of the order of magnitude of the particle sizes involved, said size controlling step is preferably performed by dynamic light scattering analysis. When said industrial process comprises a post-processing step performed following the emulsification step, it may further comprise one or more steps of controlling the size of droplets or micelles produced during or after said post-processing step, in which case said size controlling step after said post-processing step may be performed by dynamic light scattering analysis. The size controlling step may be performed in such a way as to measure the average size and/or the size distribution of the droplets or micelles produced during the various steps of said industrial process.

According to experience accumulated in the practice of the invention, it is estimated that the following parameters may affect the storage stability of the obtained emulsion:

emulsion stability may depend upon the linear flow rate of the liquid mixture through the magnetic field(s). There seems to be a threshold flow rate below which there is little or no improvement in the stability of the pre-mixture. The gain in emulsion stability increases with the said linear flow rate. A transition from laminar flow to turbulent flow, and the occurrence of undesired cavitation, may in most cases set the maximum admissible linear flow rate. An optimum flow rate may also exist and can be determined by the skilled for each equipment without undue experimentation;

emulsion stability is usually improved when the number of re-circulation times through the magnetic field(s) is raised. Such improvement is mostly significant in the first set of re-circulation times, however prolonged circulation has no adverse effect. Below the threshold flow rate mentioned hereinabove, raising the number of re-circulation times does not help to improve the stability of the emulsion;

time elapsed between two re-circulation times through the magnetic field while the mixture is in the liquid containing portion or tubing may also affect the stability of the emulsion produced. In a preferred embodiment, the pre-emulsion is treated a number of times with short time intervals so as to reach sufficient stability for storage;

shape of the liquid containing portion (reservoir) may also be important, especially in order to ensure that the entire volume of the emulsion is treated and to avoid zones where the pre-mix may stagnate. Such stagnant zones comprising an emulsion pre-mix with larger micelles can be responsible for coagulation and phase separation of the emulsion.

The present invention also provides products having adequate or improved storage stability, such as detergents, cleaning products, lubricants, cosmetic, veterinary and pharmaceutical compositions (e.g. creams and ointments) and food products, including an emulsion prepared according to the method described herein-above.

The present invention shows a number of advantages over the methods of the prior art. It achieves a substantial simplification in terms of equipment and maintenance costs associated with the equipment required for emulsification. It allows for easy access to and efficient control of the desired emulsion characteristics (including, but not limited to, micelle size) and emulsion storage stability, whatever the nature of the lipophilic phase and its proportion in the emulsion. Thirdly, it is widely applicable to all kinds of emulsions, including oil-in-water and water-in-oil emulsions, as well as to the manufacturing of all kinds of liposomes.

The following examples are provided for illustrating the principles and methods of the invention but should not be construed as limiting the scope of the invention in any way.

EXAMPLE 1

Preparation of an Oil-in-Water Emulsion 0.930 kg of a fatty acid commercially available from Oleon (Belgium) under the trade name Radiacid 0166 and 0.061 kg of a surfactant commercially available from Oleon (Belgium) under the trade name Radiasurf 7403 were added to 2 kg of de-ionised water. The resulting pre-mix was vigorously stirred with an IKA RE16 mixer at 300 rpm, then the suspension was slowly heated to a temperature in the range of 60 to 65° C. with an IKA RCT heater, said temperature being controlled by means of an IKA ETS-D4 apparatus. After 1 hour, temperature had reached 60.7° C. Then, 11.7 g of a 50 weight % NaOH solution was added dropwise while continuing stirring of the mixture, resulting in a temperature increase up to 62.2° C. As a result, a white suspension was obtained.

The hot suspension was then magnetically treated in an emulsification system schematically shown in FIG. 1A and which may be described as follows. The system comprises a tubing (1); two external magnetic devices (2) arranged in series, commercially available from CEPI-CO (Antwerp, Belgium) under the trade name CEPI-SAN R1/2D and providing a strength of about 10,000 gauss, the said magnetic devices being mounted so as to create two consecutive orthogonal magnetic fields inside the fluid passing through; a pump (4) commercially available from Thermo Electron GmbH, Karlsruhe, Germany under the trade name Haake D8 and disposed inside a reservoir (5) being a so-called Haake circulation bath for receiving the suspension. The tubing (1) was attached to the pump (4) in such a way that the magnetic device (2) was in a downstream direction. The hot suspension was poured into the reservoir (5), while mechanical stirring was immediately started by means of the IKA RE16 mixer (not shown in FIG. 1A) operated at 200 rpm. The suspension was pumped through pump (4) at a speed of about 3 l/minute through the magnetic devices (2), and such treatment was continued for 360 minutes, while allowing the suspension to cool spontaneously.

Temperature of the mixture was measured during treatment and, at certain periods of time, a sample of the treated suspension was taken and stored at room temperature (about 20° C.). Samples were kept in small glass vials (7 ml) for visual inspection. An overview of the sampling data (sample temperature and reference number) is given in table 1.

TABLE 1

| time (min) | temperature (° C.) | sample |
|---|---|---|
| 0 | 58.8 | s0 |
| 15 | 51.6 | s1 |
| 60 | 39.9 | s2 |
| 180 | 30.6 | s3 |
| 360 | 28.8 | s4 |

Sample s0 was separating quickly into a white yellow top layer and a white water layer. Each of emulsion samples s1-4 appeared by eye to be stable after 6 hours. After overnight storage at room temperature, most of the emulsion samples s1-4 showed some phase separation, although less significant when a longer magnetic treatment was continued (i.e. sample s4).

This experiment demonstrates that conducting a pre-mix of an aqueous phase and a lipophilic phase through a magnetic field under suitable conditions significantly improves the storage stability of the said oil-in-water pre-mix.

EXAMPLE 2

Preparation of an Oil-in-Water Emulsion

In a first step, 1.163 kg of the same fatty acid and 0.076 kg of the same surfactant as used in example 1 were added to 2.5 kg of de-ionised water. The resulting pre-mix was vigorously stirred with an IKA RE16 mixer at 300 rpm. The suspension was then slowly heated to a temperature of 63° C. with an IKA RCT heater. Temperature was controlled with an IKA ETS-D4 apparatus. After temperature has reached 60.5° C., 14.62 g of a 50% by weight NaOH solution was added dropwise to the suspension, while continuing stirring of the mixture. The suspension was then allowed to cool to 40° C.

Figure 1B:
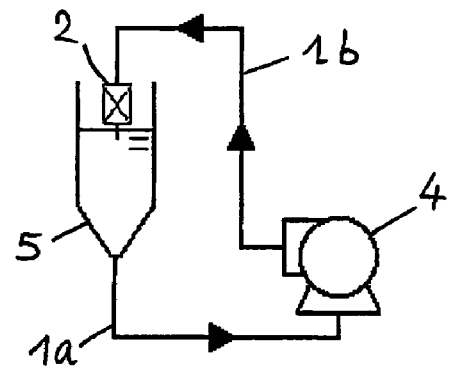
FIG. 1B represents another embodiment of an emulsification system for performing a method according to the invention.

In a second step, 1.5 l of the suspension (still at a temperature of 40° C.) was poured into the liquid containing portion (5), having a 2 l volume, of the emulsification system shown in FIG. 1B. Said liquid containing portion (5) consists of a cylindrical flask with a conic bottom to which a tubing (1a) (commercially available under the trade name Masterflex Tygon lab I/P 70 from Cole-Parmer Instrument Company). By means of the pump (4) (commercially available from Cole-Parmer Instrument Company under the trade name Masterflex I/P) the suspension was pumped through tubing (1b) to the top of the flask (5). A commercial magnetic device (2) commercially available from CEPI-CO (Antwerp, Belgium) under the trade name CEPI-SAN R1/4D was attached to the end of the tubing (1b) at the inlet of the liquid containing portion (5). The pump (4) was continuously operated at a speed of 4.7 l/minute for 60 minutes.

At certain periods of time (expressed in minutes), a sample of the magnetically treated suspension was taken in small glass vials (7 ml) for visual inspection and stored either at room temperature (in the range of 20 to 25° C.) or in the refrigerator (7° C.). Sample s0, with a time indication 0', was taken at the outlet of the magnetic device (2) after one single pass of the suspension through the said device, while samples s1-s3 were taken in the flask (5). An overview of the sampling data (sample reference numbers) is given in table 2.

TABLE 2

| time (min) | sample room temp | sample refrigerator |
|---|---|---|
| 0' | s0 | s'0 |
| 15 | s1 | s'1 |
| 30 | s2 | s'2 |
| 60 | s3 | s'3 |

3.5 hours after sampling, s0 and s'0 showed phase segregation. Inspection of the samples s1, s'1, s2, s'2, s3 and s'3 showed that they were still stable 21 hours after sampling but, after 92 hours storage, revealed some phase separation. This indicates that, under the present experimental conditions, a single pass of the suspension through the magnetic field provides very limited storage stability of the resulting emulsion.

EXAMPLE 3

Magnetic Treatment of a Fatty Acid Aqueous Pre-mix

A fatty acid aqueous suspension was made exactly as in the first step of example 2. After further spontaneous cooling down and storing for 5 days at room temperature (about 20° C.), the batch of the pre-mixed suspension was stirred once more (by means of IKA RE16 operated at 300 rpm) but not heated. Part of the batch was used for a blank experiment as explained below.

Figure 1C:
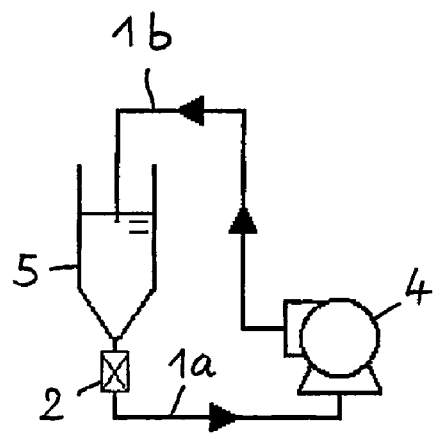
FIG. 1C represents yet another embodiment of an emulsification system for performing a method according to the invention.
Figure 1:
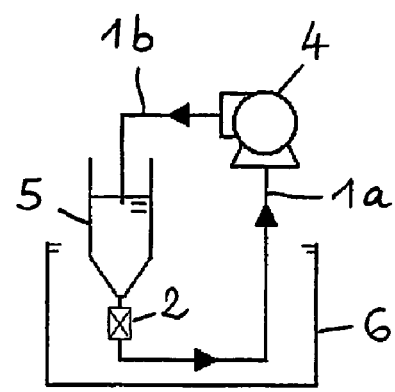
FIG. 1D represents yet another embodiment of an emulsification system for performing a method according to the invention.

250 ml of the pre-mixed suspension (still at room temperature) was poured into the liquid containing portion (5), having a 2 litre volume, of the emulsification system shown in FIG. 1C. Said liquid containing portion (5) consists of a cylindrical flask with a conic bottom. A commercial magnetic device (2) (same as used in example 2) is mounted in a loop at the outlet of the liquid containing portion (5), except during the blank experiment. The loop consists of a tubing (1a, 1b) (same type as used in example 2) which connects the magnetic device (2) to the inlet on top of the flask (5) via a pump (4) (same as used in example 2). The said pump was continuously operated at a speed of 4.7 l/minute.

At certain periods of time (expressed in minutes), a sample of the magnetically treated suspension was taken at the end of the tubing (1b) positioned at the inlet of the flask (5), the pump (4) being turned off during sampling. Samples were kept in small glass vials (7 ml) for visual inspection and stored either at room temperature (in the range of 20 to 25° C.) or in the refrigerator (7° C.). An overview of the sampling data (sampling time, number of re-circulation times, and sample reference number) is given in table 3. The number of passages (re-circulation times) as given in table 3 was estimated based on the volume of the pre-mixed suspension introduced into the flask and the flow speed.

TABLE 3

| | time (min) | number of passages | sample room temp | sample 7° C. |
|---|---|---|---|---|
| experiment with | 0' | 1 | s0 | s'0 |
| | 1 | 12 | s1 | s'1 |

TABLE 3-continued

| | time (min) | number of passages | sample room temp | sample 7° C. |
|---|---|---|---|---|
| magnetic device | 2 | 24 | s2 | s'2 |
| | 15 | 180 | s3 | s'3 |
| blank experiment | 2 | 24 | b2 | b'2 |
| | 15 | 180 | b3 | b'3 |

All samples prepared with the magnetic device were emulsions, the stability of which depended on the treatment time. After 18 hours storage, sample s0 and s'0 showed some phase separation. Samples s1, s'1, s2 and s'2 were still stable after 22 hours, but their inspection after 42 hours revealed some phase separation. Sample s3 showed phase separation only 51 hours after treatment. 14 days after treatment, sample s'3 was still stable.

The storage stability of the samples of the blank experiment was clearly lower than that of the magnetically treated ones: samples b2, b'2, b3 and b'3 showed phase separation within 20 hours after treatment. This demonstrates that conducting an emulsion through a magnetic field under the above experimental conditions significantly contributes to the formation of a stable emulsion.

EXAMPLE 4

Magnetic Treatment of a Fatty Acid Aqueous Pre-mix

A fatty acid aqueous suspension was made exactly as in the first step of example 2. After further spontaneous cooling down and storing for 11 days at room temperature (about 20° C.), the batch of the pre-mixed suspension was stirred once more (by means of IKA RE16 operated at 300 rpm) but not heated. Part of the batch was used for a blank experiment as explained below.

250 ml of the pre-mixed suspension (still at room temperature) was treated in the emulsification system shown in FIG. 1C, the pump being continuously operated at a speed of 6.3 l/minute, except that the magnetic device was not mounted in the loop during the blank experiment. After 1 hour of treatment, sampling of the emulsion was effected both at the outlet of the tubing and in the flask (5). Samples were kept in small glass vials (7 ml) for visual inspection and stored either at room temperature (at 25° C.) or in the refrigerator (7° C.). An overview of the sampling data (sampling location, sample reference number) is given in table 4.

TABLE 4

| | sampling | sample room temp | sample refrigerator |
|---|---|---|---|
| experiment with magnetic device | reservoir | s1 | s'1 |
| | tubing | s2 | s'2 |
| blank experiment | reservoir | b1 | b'1 |
| | tubing | b2 | b'2 |

Samples b'1 and b'2 were still stable after 96 hours storage. Phase separation occurred in samples b1 and b2 after 29.5 and 70 hours respectively. Samples s1 and s2 showed phase separation after 101 and 165 hours of storage respectively. Samples s'1 and s'2 were still stable after 197 hours of storage.

Improved storage stability was observed as compared to the previous experiments of examples 2 and 3. This can be attributed to the higher pumping speed (with respect to example 3) or to the fact that the emulsion was pumped into the flask (5) through the magnetic device (with respect to example 2).

EXAMPLE 5

Fatty Acid Emulsion Stability

A fatty acid aqueous suspension was made exactly as in the first step of example 2.

In a second step, 1.5 l of the suspension (still at a temperature of 40° C.) was poured into the liquid containing portion (5), having a 2 l volume, of the emulsification system shown in FIG. 1C, the pump (4) being continuously operated at a speed of 4.7 l/minute. After 1 hour treatment, the emulsion was pumped through the magnetic device into a 1 litre glass Erlenmeyer where the sample was collected and stored at room temperature for further stability determination by visual inspection. The sample was found to be stable for more than 19 days, i.e. significantly more than the samples of example 3 being manufactured under the same conditions but stored in small glass vials. This indicates that factors such as surface to volume ratio, shape and chemical nature of the storage recipient can be critical for emulsion stability, especially when stability over long storage periods is desired. Thus, evaluation of emulsion stability of emulsion samples stored in small flasks such as in examples 1 to 3 rather represents a kind of accelerated stability test.

EXAMPLE 6

Magnetic Treatment of Semi-Skimmed Milk

A semi-skimmed milk, manufactured by Stassano (Belgium) and containing 1.6 g lipids/100 ml and 3.3 g proteins/100 ml was used in this experiment. The emulsification system used is shown in FIG. 1D and comprises a cylindrical flask (5) with a conic bottom which is used as a liquid containing portion. A magnetic device (2) of the Al—Ni—Co type (same as used in example 2) and providing a strength of about 10,000 gauss, is attached to the bottom of the flask (5) by means of a tubing (Masterflex Tygon lab I/P 70 from Cole-Parmer Instrument Company) in such a way that the magnetic device is in a downstream direction. The tubing (1a, 1b) connects the magnetic device (2) via the pump (4) (Masterflex I/P) with the inlet on top of the flask (5). The whole system is positioned in a box (6) filled with a mixture of water and ice. The magnetic device (2), part of the tubing (1a) and part of the flask (5) are immersed in the said mixture. This setup allows cooling milk at a temperature below 20° C.

After 500 ml milk has been poured into flask (5), pump (4) is turned on and continuously operated at a flow rate of 4.7 l/minute, i.e. a linear velocity of 1.1 m/s. Before treatment, and after 5 minutes and 10 minutes of magnetic treatment respectively, samples were taken in the flask (5) for further analysis.

The size of fat micelles present in milk were analysed with diffusive light scattering, using a high performance particle sizer with a He-Ne-Laser (2,5 mW) from ALV Company. Measurements were performed with water as standard reference for viscosity, and without making a correction for viscosity, therefore micelles sizes should be interpreted as relative rather than absolute values, as shown in FIG. 2.

Figure 2:
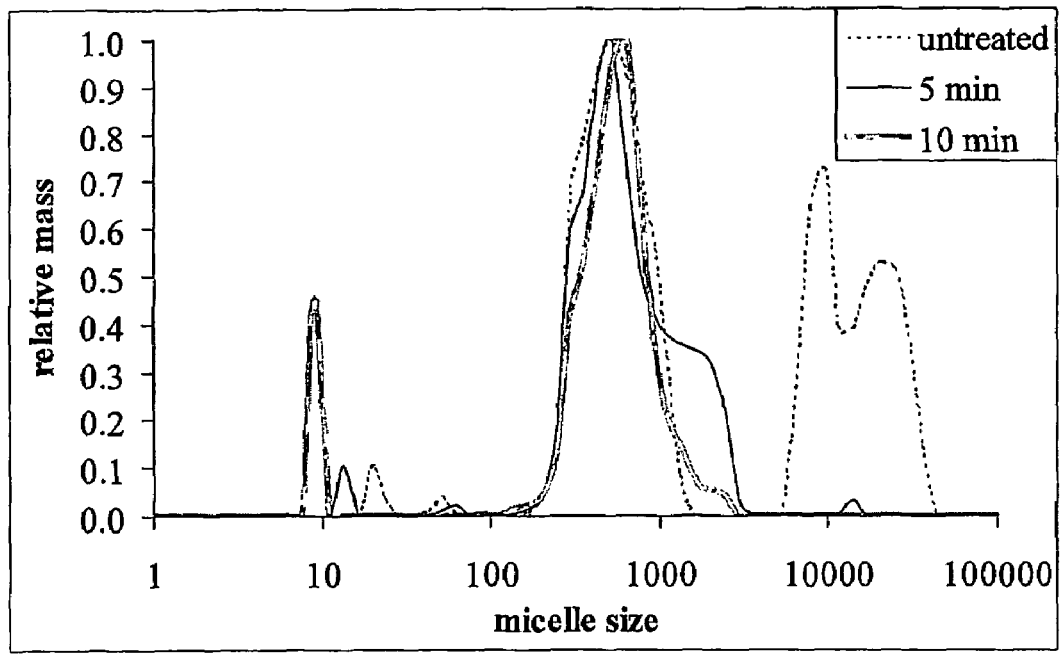
FIG. 2 represents the distribution of relative masses of fat globules in semi-skimmed milk before and after 5 minutes or 10 minutes of a magnetic treatment according to the invention.

Three important effects of magnetic treatment are shown in FIG. 2:

- a very significant reduction of the relative mass of micelles sized between 5,000 and 45,000 nm. After 10 minutes of treatment these large micelles have completely disappeared.
- the peak of micelle size around 600 nm becomes sharper (i.e. a narrower micelle size distribution around 600 nm) when treatment time increases.
- in the area of smallest micelles or particles average size, a shift of the 20 nm peak (before treatment) clearly occurs towards a 13 nm peak (after 5 minutes treatment) and a 9 nm peak of significant importance (after 10 minutes treatment), i.e. a more than 50% reduction in the average size of smallest micelles.

EXAMPLE 7

Magnetic Treatment of Whole Milk

A whole milk, manufactured by Stassano (Belgium) and containing 3.6 g lipids/100 ml and 3.3 g proteins/100 ml was used in this experiment. 400 ml of this whole milk was treated in the same emulsification system as in example 6. Before treatment and after 5 minutes, 10 minutes and 30 minutes of magnetic treatment respectively, samples were taken in the flask and analysed by the same technique as in example 6.

Figure 3:
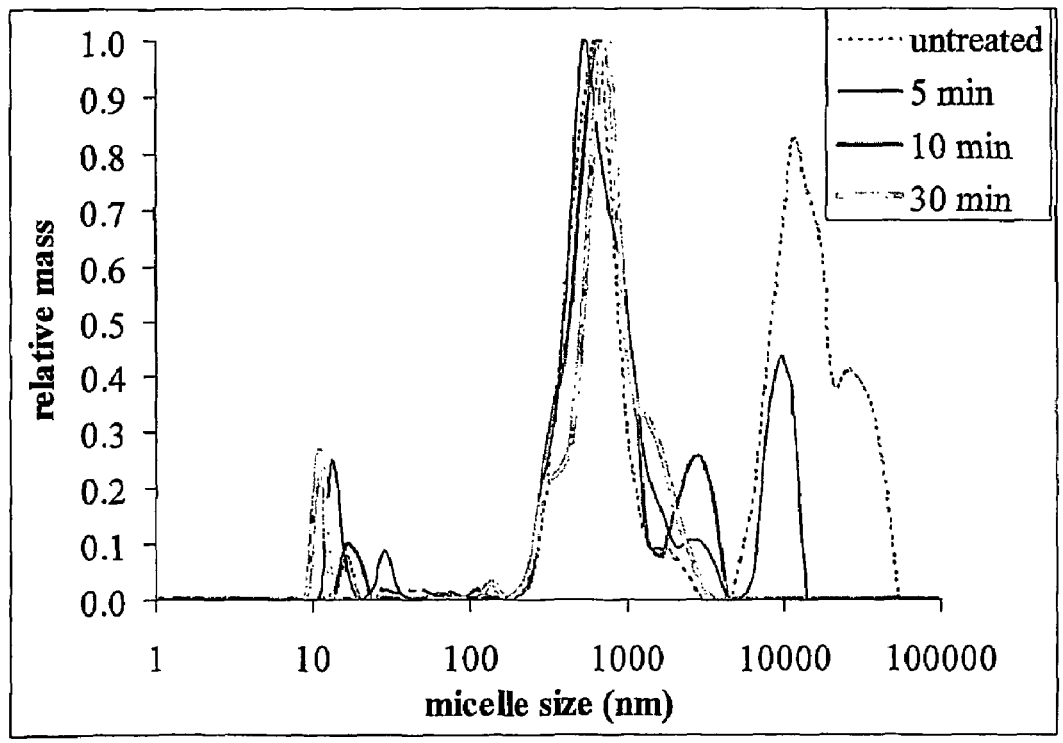
FIG. 3 represents the distribution of relative masses of lipid miscelles in whole milk before and after respectively 5 minutes, 10 minutes or 30 minutes of a magnetic treatment according to the present invention.

The effects of magnetic treatment are shown in FIG. 3:

- the relative mass of lipid micelles with sizes between 4,000 and 53,000 nm is significantly reduced. After 10 minutes of treatment these large micelles have almost entirely disappeared;
- an increased presence of micelles having a particle size around 600 nm was observed, presumably due to the disruption of larger micelles with sizes above 4,000 nm; and
- a shift of the smallest micelles towards even smaller sizes may be observed.

EXAMPLE 8

Magnetic Treatment of a Dodecane Water-in-Oil Emulsion 20 g of dodecane (commercially available from Acros Organics, 99% purity) and 1 g of a surfactant commercially available from Oleon (Belgium) under the trade name Radiamuls 2152 (previously heated to about 40° C.) were mixed in a glass bottle, resulting in a transparent mixture. 80 g of bi-distilled water was then added and the bottle was thoroughly shaken, resulting in a milky white emulsion. This emulsion was magnetically treated in the emulsification system shown in FIG. 4 and comprising, within a loop, a tubing (1) (Masterflex Tygon lab I/P 70 from Cole Parmer Instrument Company), a magnetic device (2) of the Al—Ni—Co type and providing a strength of about 10,000 gauss (same as used in example 2) and a 3-way horizontal ball valve (3) (commercially available from Georg Fischer Rohrleitungssysteme AG under the trade name 343 DN10/15). The tubing (1) was attached to a pump (4) (Masterflex I/P) in such a way the magnetic device (2) was in a downstream direction. The total volume of this system is 0,100 l. Part of the system is placed in a box (6) cooled with a mixture of water and ice. As a result the emulsion temperature is kept below room temperature during treatment. The emulsion was magnetically treated during 20 minutes while applying a pumping speed of 4.7 l/minute (corresponding to a linear flow rate of 1.1 m/s).

The magnetically treated emulsion was sampled at room temperature, the sample (s2) was inspected visually and compared to the corresponding sample (s1) taken before treatment, both samples being collected and kept in a 120 ml glass bottle. Sample s1 shows phase separation within 2 hours, including a transparent watery top layer. Sample s2 was still stable after 94 hours, its phase separation occurring only after 118 hours.

EXAMPLE 9

Magnetic Treatment of a 20% Soybean Oil Emulsion 20 g of a soybean oil (commercially available from Lesieur) and 5 g of the same surfactant Radiasurf 7403 already used in example 1 were mixed in a glass bottle, resulting in a turbid yellow mixture. 80 g of bi-distilled water was added and the bottle was thoroughly shaken, resulting in a white-yellow emulsion.

Figure 4:
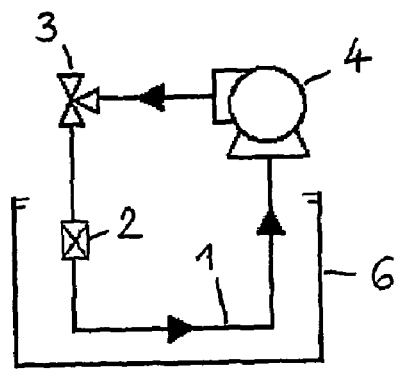
FIG. 4 represents another embodiment of an emulsification system.
Figure 5:
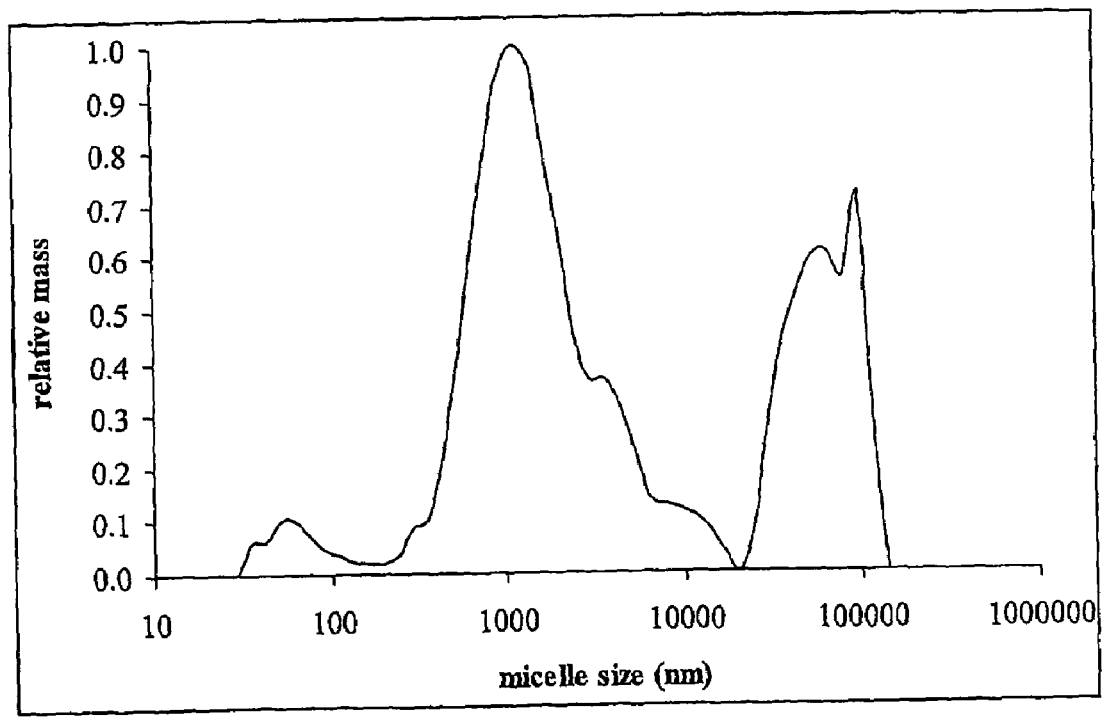
FIG. 5 represents the distribution of relative masses of micelles in a 20% soybean oil emulsion after 20 minutes of a magnetic treatment according to the invention.

This emulsion was magnetically treated in the emulsification system shown in FIG. 4 at the same pumping speed of 4.7 l/minute. The magnetically treated emulsion was sampled at room temperature, the sample (s2) was inspected visually and compared to the corresponding sample (s1) taken before treatment. Improvement in storage stability was significant, since s1 showed phase separation only 5 minutes after preparation, whereas s2 was still stable after 3 hours storage at room temperature and showed de-mixing only after 13.5 hours storage. Sample s2 was also analysed by diffusive light scattering under the same conditions as in example 6. FIG. 5 shows the micelle size distribution of sample s2 in the range from 30 nm to 100,000 nm. Two major micelle sizes are present in this emulsion: the most important fraction size is around an average of 1,100 nm, whilst a second minor fraction with an average size of about 65 nm is also present. The peak at 100,000 nm is due to mathematical processing and is therefore not representative of sample composition.

EXAMPLE 10

Magnetic Treatment of a 60% Soybean Oil Emulsion 60 g of a soybean oil (commercially available from Lesieur) and 5 g of the same surfactant Radiasurf 7403 already used in example 1 were mixed in a glass bottle, resulting in a yellow mixture. 40 g of bi-distilled water was added and the bottle was thoroughly shaken, resulting in a turbid yellowish emulsion.

Figure 6:
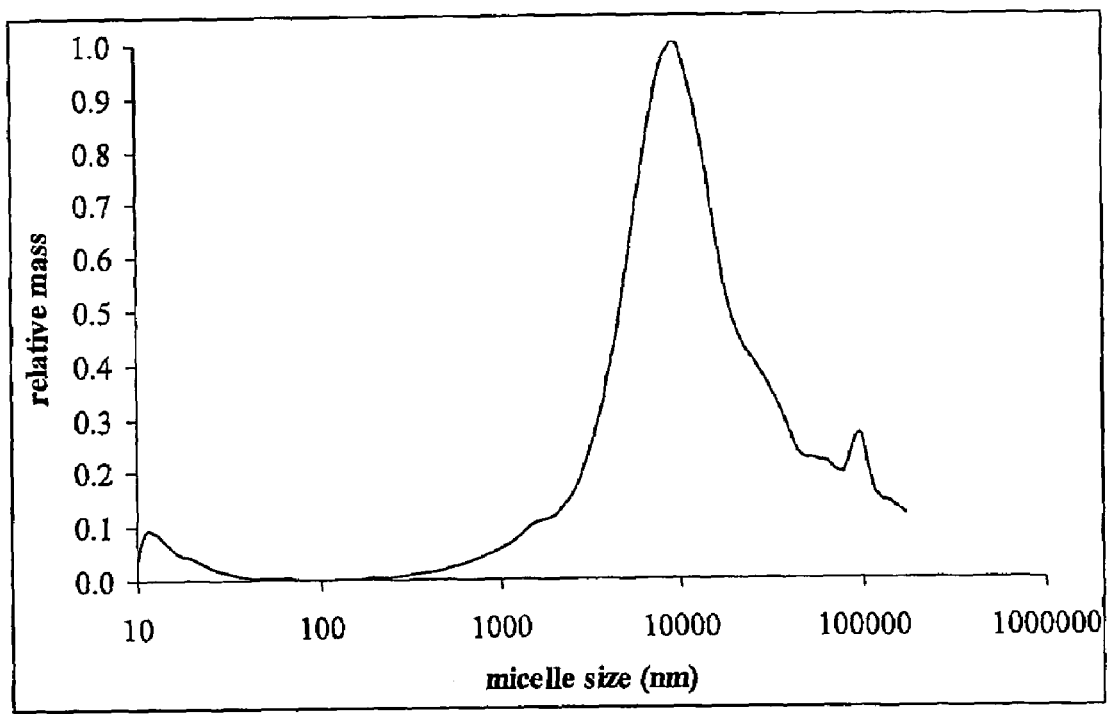
FIG. 6 represents the distribution of relative masses of micelles in a 60% soybean oil emulsion after 20 minutes of a magnetic treatment according to the invention.

This emulsion was magnetically treated in the emulsification system shown in FIG. 4 at the same pumping speed of 4.7 l/minute. The magnetically treated emulsion was sampled at room temperature, the sample (s4) was inspected visually and compared to the corresponding sample (s3) taken before treatment. Improvement in storage stability was significant, since s3 showed phase separation only 60 minutes after preparation, whereas s4 was still stable after 18 hours storage at room temperature and showed de-mixing only after 109 hours storage. Sample s4 was also analysed by diffusive light scattering under the same conditions as in example 6. FIG. 6 shows the micelle size distribution of sample s4 in the range from 10 nm to 100,000 nm. Two major micelle sizes are present in this emulsion: the most important fraction size is around an average of 950 nm, whilst a second minor fraction with an average size of about 15 nm is also present. The peak at 100,000 nm is due to mathematical processing and is therefore not representative of sample composition.

EXAMPLE 11

Preparation of an Oil-in-Water Emulsion

A fatty acid aqueous suspension was made exactly as in the first step of example 2.

In a second step, the said suspension (still at a temperature of 40° C.) was treated in the emulsification system shown in FIG. 4, the pump (4) being continuously operated at a speed of 1.7 l/minute (corresponding to a linear flow rate of 0.4 m/s).

At certain periods of time (expressed in minutes), a sample of the magnetically treated suspension was taken and stored either at room temperature (in the range of about 25 to 30° C.) or in the refrigerator (7° C.) for visual inspection or dynamic light scattering (DLS) analysis, using the same technique as in example 6. An overview of the sampling data (sampling reference numbers) is given in table 5. Sample s'2, with a time indication 0', indicates a sample taken shortly after pouring the emulsion into the tubing system (in doing so, the pump was turned on a few times, meaning the liquid had yet passed through the magnetic device a few times).

TABLE 5

| time (min) | sample room temp | sample refrigerator | DLS |
|---|---|---|---|
| 0 | s1 | s'1 | |
| 0' | | s'2 | |
| 15 | | s'3 | |
| 30 | | s'4 | s"4 |
| 60 | s5 | s'5 | s"5 |

Samples s1 and s'1 separated quickly into a white yellow top layer and a white water layer. Sample s'2 separated similarly 4 hours later. Sample s'3 was de-mixed after 14 hours. Samples s'4, s5 and s'5 remained homogeneous for at least 72 hours but were de-mixed after 138 hours.

Figure 7:
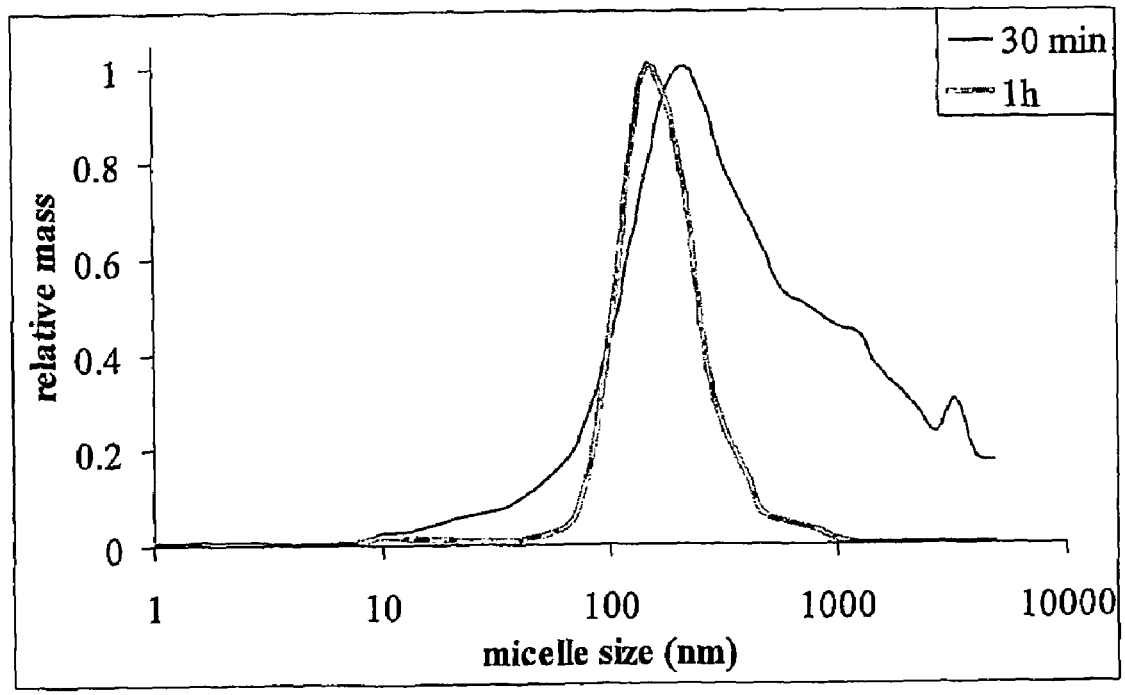
FIG. 7 represents the distribution of relative masses of micelles in a fatty acid aqueous emulsion after 30 minutes or 60 minutes of a magnetic treatment according to the invention.

FIG. 7 shows the distribution of relative masses of the micelles (in the range from 10 nm to 2,000 nm) of samples s"4 and s"5 obtained after 30 minutes and 60 minutes treatment respectively. This clearly shows a narrowing of the distribution around an average size of about 150 nm upon prolonged magnetic treatment for 1 hour.

The invention claimed is:

1. An emulsification method comprising flowing, conducting or circulating a pre-mix of two or more immiscible liquids through one or more magnetic fields under conditions to emulsify said pre-mix, wherein said pre-mix of two or more immiscible liquids comprises at least a hydrophilic liquid, and at least a lipophilic liquid selected from the group consisting of edible oils, fats, fatty acids and esters thereof formed from a saturated or unsaturated linear or branched aliphatic alcohol having from 1 to 18 carbon atoms or from a saturated or unsaturated linear or branched aliphatic polyol having from 2 to 6 carbon atoms or from a polyethyleneglycol or polypropyleneglycol or methoxy polyethyleneglycol having a molecular weight up to 1,500; natural or synthetic, saturated, mono-unsaturated or polyunsaturated acids having from 8 to 24 carbon atoms and optionally one or more functional groups selected from hydroxy and epoxy; lipids including mono- and polyacylglycerols, phosphoglycerides, sphingolipids, amino-amidines, and mixtures thereof, wherein the linear flow rate of said liquids through each said magnetic field is between 0.25 and 25 m/s, wherein the strength of each said magnetic field is at least 2,000 gauss, and wherein said pre-mix does not comprise milk.

2. An emulsification method according to claim 1, wherein said hydrophilic liquid is an aqueous or nearly-aqueous phase.

3. An emulsification method according to claim 1, wherein said pre-mix further comprises one or more viscosity regulators and/or one or more emulsifiers or emulsion stabilizers or surfactants.

4. An emulsification method according to claim 1, wherein said pre-mix further comprises solid particles suspended therein.

5. An emulsification method according to claim 1, wherein said hydrophilic liquid is an aqueous or nearly-aqueous phase and wherein the proportion of said lipophilic liquid in said pre-mix is within a range from 3 to 60% by weight.

6. An emulsification method according to claim 1, wherein said premix of two or more immiscible liquids is re-circulated from 10 to 10,000 times through each said magnetic field.

7. An emulsification method according to claim 1, wherein the linear flow rate of said liquids through each said magnetic field is between 0.6 and 5 m/s.

8. An emulsification method according to claim 1, wherein the residence time of said fluid through each said magnetic field is between 60 microseconds and 10 seconds.

9. An emulsification method according to claim 1, wherein flowing said liquids through said magnetic field(s) is effected at a temperature between 10° C. and 90° C.

10. An industrial process including an emulsification method according to claim 1 as a process step.

11. An industrial process according to claim 10, wherein said process further comprises one or more post-processing steps performed following the emulsification step.

12. An industrial process according to claim 10, wherein said process further comprises a drying step for at least partially removing the hydrophilic liquid present in the emulsification step.

13. An industrial process according to claim 10, wherein said process further comprises one or more steps of controlling the size of droplets or micelles produced during the emulsification step.

14. An industrial process according to claim 10, wherein said process further comprises one or more steps of controlling the size of droplets or micelles produced during the emulsification step and wherein said size controlling step is performed by dynamic light scattering analysis.

15. An industrial process according to claim 10, wherein said process further comprises a sonication step.

16. An industrial process according to claim 10, wherein said process further comprises a cooling step or a heating step.

17. An industrial process according to claim 10, wherein said process further comprises a freeze-drying step.

* * * * *

UNITED STATES PATENT AND TRADEMARK OFFICE
CERTIFICATE OF CORRECTION

| | | |
|---|---|---|
| PATENT NO. | : 7,629,390 B2 | Page 1 of 1 |
| APPLICATION NO. | : 10/534677 | |
| DATED | : December 8, 2009 | |
| INVENTOR(S) | : Nuyens et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1048 days.

Signed and Sealed this

Twelfth Day of October, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,629,390 B2 | Page 1 of 1 |
| APPLICATION NO. | : 10/534677 | |
| DATED | : December 8, 2009 | |
| INVENTOR(S) | : Nuyens et al. | |

It is certified that error appears in the above-identified patent and that said Letters Patent is hereby corrected as shown below:

On Title Page, under OTHER PUBLICATIONS, replace "206628/2005" with --506628/2005--.

Signed and Sealed this
Second Day of October, 2012

David J. Kappos
*Director of the United States Patent and Trademark Office*